US012354324B2

(12) United States Patent
Diesendruck et al.

(10) Patent No.: US 12,354,324 B2
(45) Date of Patent: Jul. 8, 2025

(54) GENERATING LARGE DATASETS OF STYLE-SPECIFIC AND CONTENT-SPECIFIC IMAGES USING GENERATIVE MACHINE-LEARNING MODELS TO MATCH A SMALL SET OF SAMPLE IMAGES

(71) Applicant: Microsoft Technology Licensing, LLC, Redmond, WA (US)

(72) Inventors: Maurice Diesendruck, Bellevue, WA (US); Harsh Shrivastava, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 18/079,386

(22) Filed: Dec. 12, 2022

(65) Prior Publication Data

US 2024/0193911 A1 Jun. 13, 2024

(51) Int. Cl.
*G06N 3/0475* (2023.01)
*G06V 10/74* (2022.01)
*G06V 10/774* (2022.01)
*G06V 20/30* (2022.01)

(52) U.S. Cl.
CPC .......... *G06V 10/761* (2022.01); *G06V 10/774* (2022.01); *G06V 20/30* (2022.01)

(58) Field of Classification Search
CPC .... G06V 10/761; G06V 10/774; G06V 20/30; G06N 3/098; G06N 3/044; G06N 3/045; G06N 3/0464; G06N 3/0475; G06T 2207/10004; G06T 2207/20081; G06T 2207/20084; G06T 11/00

See application file for complete search history.

(56) References Cited

U.S. PATENT DOCUMENTS

| | | | | |
|---|---|---|---|---|
| 10,977,528 B1 * | 4/2021 | Tong | ................ | G06F 18/22 |
| 11,842,267 B2 * | 12/2023 | Liu | ................ | G06T 11/001 |
| 2013/0315477 A1 * | 11/2013 | Murray | ................ | G06F 16/583 |
| | | | | 382/159 |
| 2016/0364625 A1 * | 12/2016 | Lin | ................ | G06T 7/60 |
| 2017/0139572 A1 * | 5/2017 | Sunkavalli | ................ | G06F 3/04845 |

(Continued)

OTHER PUBLICATIONS

Lee et al., "Automatic Content-Aware Color and Tone Stylization", IEEE Conference on Computer Vision and Pattern Recognition, 2016 (Year: 2016).*

(Continued)

*Primary Examiner* — Aaron W Carter
(74) *Attorney, Agent, or Firm* — Ray Quinney & Nebeker; Chris Hallstrom

(57) ABSTRACT

The present disclosure relates to utilizing a style-matching image generation system to generate large datasets of style-matching images having matching styles and content to an initial small sample set of input images. For example, the style-matching image generation system utilizes a selection of style-mixed stored images with a generative machine-learning model to produce large datasets of synthesized images. Further, the style-matching image generation system utilizes the generative machine-learning model to conditionally sample synthesized images that accurately match the style, content, characteristics, and patterns of the initial small sample set and that also provide added variety and diversity to the large image dataset.

20 Claims, 6 Drawing Sheets

(56) References Cited

U.S. PATENT DOCUMENTS

| | | | |
|---|---|---|---|
| 2018/0373999 A1* | 12/2018 | Xu | G06V 20/49 |
| 2019/0164012 A1* | 5/2019 | Zisimopoulos | G06N 20/00 |
| 2019/0251612 A1 | 8/2019 | Fang | |
| 2019/0251721 A1* | 8/2019 | Hua | G06N 3/088 |
| 2019/0279075 A1* | 9/2019 | Liu | G06N 3/047 |
| 2019/0370936 A1* | 12/2019 | Zhang | G06T 3/40 |
| 2021/0097691 A1* | 4/2021 | Liu | G06V 10/764 |
| 2021/0233239 A1* | 7/2021 | Li | G16H 30/40 |
| 2021/0248727 A1* | 8/2021 | Fisher | G06N 5/01 |
| 2021/0382936 A1* | 12/2021 | Tomar | G06N 20/00 |
| 2021/0390607 A1* | 12/2021 | Jung | G06Q 30/02 |
| 2022/0004809 A1* | 1/2022 | Iyer | G06F 18/40 |
| 2022/0076374 A1* | 3/2022 | Li | G06T 3/10 |
| 2022/0092108 A1* | 3/2022 | Collomosse | G06F 16/5838 |
| 2022/0207808 A1* | 6/2022 | Saa-Garriga | G06T 11/00 |
| 2022/0222872 A1* | 7/2022 | Ghosh | G06T 11/001 |
| 2022/0254071 A1* | 8/2022 | Ojha | G06T 11/60 |
| 2022/0375024 A1* | 11/2022 | Luo | G06N 3/08 |
| 2022/0377257 A1* | 11/2022 | Wilson | G06N 3/08 |
| 2023/0351566 A1* | 11/2023 | Jeon | G06V 10/513 |
| 2023/0360294 A1* | 11/2023 | Aggarwal | G06N 3/0475 |
| 2023/0410267 A1* | 12/2023 | Song | G06V 40/161 |
| 2024/0020810 A1* | 1/2024 | Li | G06T 5/50 |
| 2024/0135621 A1* | 4/2024 | Sang | G06V 10/751 |
| 2024/0135627 A1* | 4/2024 | Song | G06T 15/02 |
| 2024/0153259 A1* | 5/2024 | Motiian | G06V 10/751 |
| 2024/0193911 A1* | 6/2024 | Diesendruck | G06T 11/00 |
| 2024/0257426 A1* | 8/2024 | He | G06T 19/20 |
| 2024/0273871 A1* | 8/2024 | Song | G06V 10/28 |
| 2025/0061545 A1* | 2/2025 | Chun | G06T 5/20 |

OTHER PUBLICATIONS

Chen, et al., "A Simple Framework for Contrastive Learning of Visual Representations", In repository of arXiv:2002.05709v3, Jul. 1, 2020, 20 pages.

Johnson, et al., "MIMIC-CXR Database", Retreived From: https://physionet.org/content/mimic-cxr/2.0.0/, Sep. 19, 2019, 9 pages.

Karras, et al., "Analyzing and Improving the Image Quality of StyleGAN", In repository of arXiv:1912.04958v2, Mar. 23, 2020, 21 pages.

Curtó, et al., "High-resolution deep convolutional generative adversarial networks.", arXiv preprint arXiv:1711,06491v17, Dec. 31, 2019, 9 Pages.

International Search Report and Written Opinion received for PCT Application No. PCT/US2023/081028, Mar. 26, 2024, 15 pages.

Osuala, et al., "Data synthesis and adversarial networks: A review and meta-analysis in cancer imaging.", Medical Image Analysis, vol. 84, Nov. 27, 2022, 51 Pages.

Regenwetter, et al., "Deep generative models in engineering design: A review.", Journal of Mechanical Design, Mar. 16, 2022, 23 Pages.

Siu, et al., "A framework for synthetic image generation and augmentation for improving automatic sewer pipe defect detection.", Automation in Construction, vol. 137, Mar. 25, 2022, 15 Pages.

\* cited by examiner

Expand The Input Image Set With Style-Mixed Images From A Catalog Of Image Styles 204

Identify A Catalog Of Stored Image Sets 302

$S_1, S_2, \ldots, S_i$

↓

Generate Embeddings Of The Initial Set Of Input Images 304

↓

Generate (or Identify) Embeddings Of Each Stored Image Set In The Catalog Of Stored Images 306

↓

For Each Stored Image Set In The Catalog, Determine An Embedding Distance With The Initial Set Of Input Images 308

$(S_i \mid d(I, S_i))$

↓

Determine A Style Distribution For The Stored Images That Reflects Style Correlations With The Initial Set Of Input Images 310

↓

Sample Stored Images From One Or More Stored Image Sets In Accordance With The Style Distribution Over The Stored Image Sets 312

$(x \mid S_i)$

Sample Images From Stored Image Sets Based On Image Content 314

$\underset{x \in S_i}{\mathrm{argmin}}\ (d(I, x))$ $S^* \sim P(x) = P(S_i \mid d(I, S_i))\ P(x \mid S_i)$

↓

Generate An Expanded Set Of Input Images By Combining The Initial Set Of Input Images And The Images Sampled From The Catalog 316

$D = I + S^*$

FIG. 3

GENERATING LARGE DATASETS OF STYLE-SPECIFIC AND CONTENT-SPECIFIC IMAGES USING GENERATIVE MACHINE-LEARNING MODELS TO MATCH A SMALL SET OF SAMPLE IMAGES

BACKGROUND

Recent years have seen significant advancements in both hardware and software with respect to digital image processing. For instance, modern computing systems continue to improve deep-learning models that focus on processing, augmenting, generating, and modifying digital images. Current examples include using deep-learning image-based models to identify and remove undesirable objects from captured images.

In many cases, image-based machine-learning models are trained based on training datasets that include a large number of images. Often, larger training datasets are needed to efficiently train deep-learning image-based models to produce accurate predictions. Conversely, when image training datasets are smaller, image-based machine-learning models cannot be accurately trained due to this small data problem of lacking sufficient training images. In several instances, individuals would like to generate deep-learning image-based models to perform specific tasks given a particular set of sample images, but small data problems prevent deep-learning image-based models from being accurately and efficiently trained. Additionally, many small image datasets also lack the image diversity needed to generate robust and comprehensive deep-learning image-based models (e.g., non-overfitted models).

Some existing computer systems attempt to overcome this problem by combining small image datasets with one or more larger image datasets that partially overlap in style and content with the original small dataset. However, in these instances, the resulting deep-learning image-based models produce results fitted to the larger datasets while significantly discounting the original small dataset.

These and other problems, which are covered below, result in inefficiencies and inaccuracies of existing computing systems with respect to image dataset generation and management.

BRIEF DESCRIPTION OF THE DRAWINGS

The detailed description provides one or more implementations with additional specificity and detail through the use of the accompanying drawings, as briefly described below.

FIG. 3 illustrates an example flow diagram for expanding an input image set with style-mixed images from stored image sets in accordance with one or more implementations.

DETAILED DESCRIPTION

Figure 1:
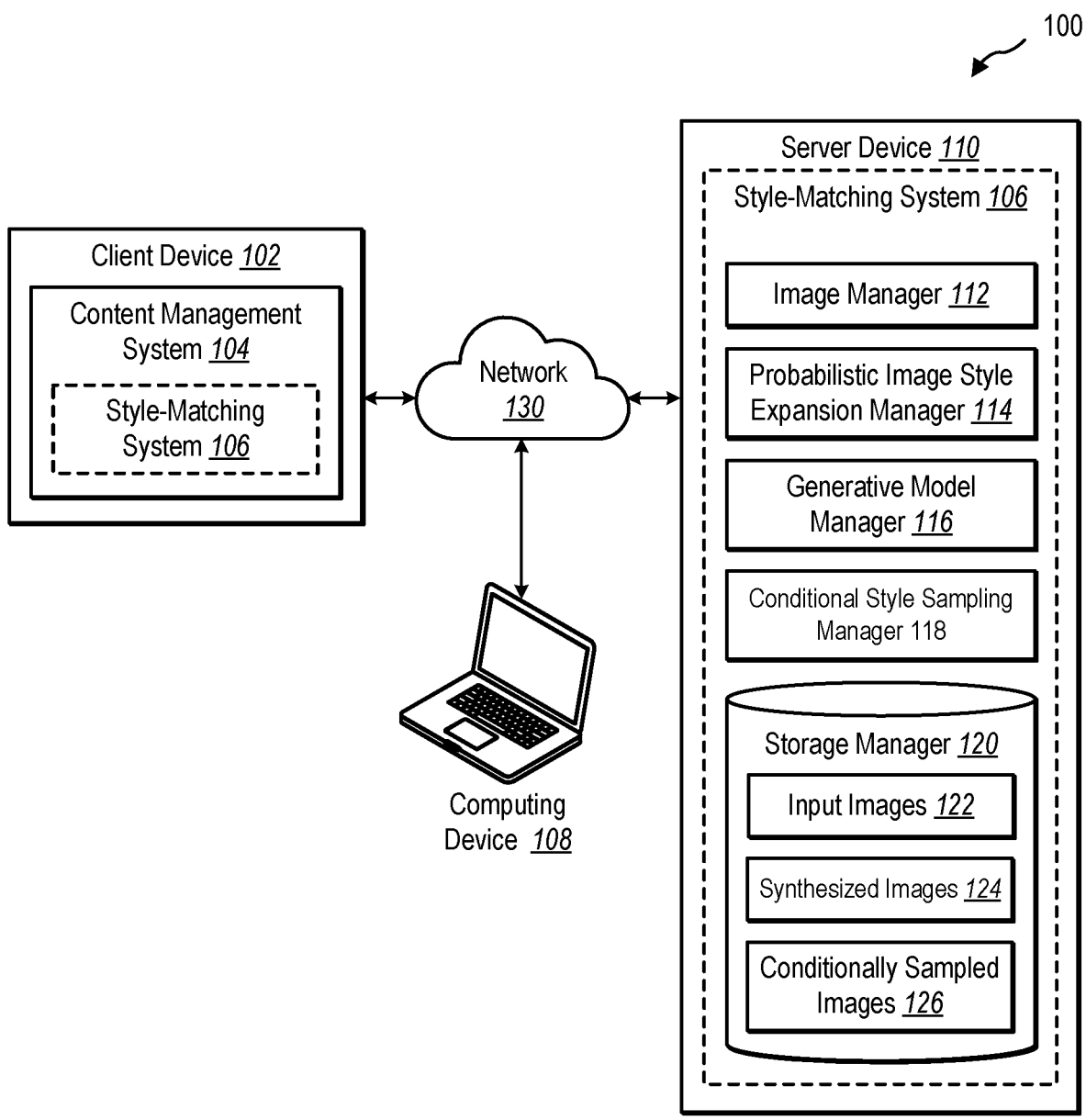
FIG. 1 illustrates an example diagram of a computing system environment where a style matching system (i.e., a style- and content-matching image dataset generation system) is implemented in accordance with one or more implementations.

This document describes utilizing a style- and content-matching image dataset generation system ("style matching system" for short) to generate large datasets of images having matching styles and content to an initial small sample set of input images. For example, the style matching system utilizes a selection of style-mixed stored images with a generative machine-learning and/or deep-learning model to produce large datasets of synthesized images. Further, the style matching system utilizes the generative deep-learning model to conditionally sample synthesized images that accurately match the style, content, characteristics, and patterns of the initial small sample set and that also provide added variety and diversity to the large image dataset.

Indeed, implementations of the present disclosure solve one or more of the problems mentioned above as well as other problems in the art with systems, computer-readable media, and methods by utilizing the style matching system to expand a small sample set of images into a larger dataset of synthesized style-matched images that is indistinguishable or has the same distribution as the original small sample image set.

To illustrate, in one or more implementations, the style matching system receives an initial set of input images, where the number of images is too small to accurately and effectively train an image-based machine-learning model. In response, the style matching system identifies a catalog of stored image sets having different styles (e.g., a style catalog of image sets). Additionally, in various implementations, the style matching system compares the initial input images to the stored image sets to determine a style distribution of distances between the initial input images and the sets of stored images.

Continuing on, in one or more implementations, the style matching system then expands the set of input images by selecting images from one or more of the stored image sets following the determined style distribution. Further, in various implementations, the style matching system generates a set of style-matching images utilizing a generative machine-learning model by generating a set of synthesized images based on the expanded set of input images as well as conditionally sampling the set of style-matching images from the set of synthesized images based on the initial set of input images.

As described herein, the style matching system provides several technical benefits with respect to image dataset generation when compared to existing computing systems. Indeed, the style matching system provides several practical applications that deliver benefits and/or solve problems by improving the creation of large datasets from a small number of image samples. Some of these technical benefits and practical applications are discussed below as well as through this document.

As noted above, when existing computer systems lack the necessary number of training images for training an image-based machine-learning model to perform a particular task, many existing computer systems join the small input to one or more larger, partly-similar datasets, which discounts the importance and features of the original input image set. Practically speaking, these existing computer systems use other larger datasets that vary in features, styles, and/or content, which results in training image-based machine-learning models to generate inaccurate results.

In contrast, the style matching system performs a number of actions to both overcome and improve upon these problems. As explained below, the style matching system generates large image datasets from a small sample of input images in such a way that the resulting synthesized images in the larger dataset are often indistinguishable and/or have the same distribution as the original small sample image set.

To elaborate, by expanding an input dataset from a small set of input images to an expanded set of images having a similar style distribution, the style matching system allows for the efficient and accurate training of a generative machine-learning model. For example, the style matching system uses a catalog of previously obtained, stored images of varying image styles to expand the initial set of input images. In addition, the style matching system determines the style distribution between the initial set of input images and the different style sets of stored images. The style matching system then samples and adds images from the stored style sets following the determined style distribution to create a style-mixed set of stored images that expands the input image set with a similar style distribution as the original input image set. Accordingly, while the styles and content of the stored images may not directly overlap styles with the initial input images, the mix of styles across multiple styles of stored images provide a similar style representation as found in the original input image set. Indeed, the strategy of learning with larger related datasets, while still conditionally sampling close to the target dataset, allows the model to learn generalizable features like shapes, textures, and edges, which can be beneficial for sampling in target regions.

Additionally, by training a generative machine-learning model based on the expanded input image dataset, the style matching system ensures that the generative machine-learning model accurately and robustly generates synthesized images that cover the style of the original input image set as well as provide an image space that offers neighboring style extensions of the original input image set. For example, by using the extended set of input images (which commonly includes the original set of input images as well as the style-mixed set of images) to train a generative machine-learning model, the style matching system creates a richer style-mixed embedding space in terms of both style and content that both encompasses the original input image set as well as includes neighboring embeddings. Indeed, the richer style-mixed embedding space covers the style and content of the original input image set as well as offers embeddings having increased style and content diversity.

By generating a large style and content matching dataset, the style matching system ensures that image-based machine-learning models are accurately and efficiently trained. For example, the style matching system utilizes the larger and style-mixed image set to efficiently train the generative machine-learning model. Further, because the style-mixed images are similar in style distribution to the original input image set, the generative machine-learning model generates an accurate embedding space (e.g., a customized pre-trained embedding space) for creating synthesized images that cover the original input image set.

Additionally, by further training and/or utilizing the initially trained generative machine-learning model to conditionally sample synthesized images from the rich style-mixed embedding space, the style matching system generates a set of style-matching images that have the same distribution as the original input image set, while also providing increased diversity over the often limited diversity of the original input image set. For instance, the style matching system utilizes the original input image set to conditionally sample synthesized images from within the style-mixed embedding space, which results in a larger dataset that is often indistinguishable from the original input image set.

As illustrated in the foregoing discussion, this document utilizes a variety of terms to describe the features and advantages of one or more implementations described herein. These terms are defined below as well as used throughout the document in different examples and contexts.

To illustrate, as an example of a term used in this document, the term "digital image" (or "image" for short) refers to a digital graphics file that when rendered displays one or more pixels. In particular, an image can include one or more objects or scenes associated with an object type or visual style. Images can include image styles and image content.

As another example of a term used in this document, the term "image style" (or "style" for short) refers to the look and feel of an image. Examples of styles include geometry, visual theme, topic, color palette, arrangement, feature sets, creation medium, characteristics, scale, resolution, perspective, capture type, spacing, object types, and/or other image styles that distinguish one set of images from another image set. For example, with X-ray images, the style is characterized, in part, by a black-and-white color palette, use of negative space, object arrangement, camera type, and possibly lower resolution. Additionally, X-ray images include one or more styles that differ from the styles in a landscape painting.

As an additional example, the term "image content" (or "content" for short) refers to the semantic meaning of what is depicted in an image. In many cases, the content of an image refers to the subject matter and/or objects in an image. Content can include foreground as well as background portions of an image.

As mentioned above, this document describes many different types of images. In various implementations, image types include input images (e.g., initial input images and expanded input images), stored images having different image styles, style-mixed images, synthesized or generated images, and style-matching images. Additionally, images are often grouped into sets based on image type. In this document, the terms "set" and "dataset" are used interchangeably.

As another example of a term used in this document, the term "input image" refers to an image used as an input to a machine-learning model, such as a generative machine-learning model either for training or inferencing (e.g., applying a model). In some examples, the terms "initial set of input images," "small image set," "input sample set," "input set of images," and similar variations (e.g., initial input image dataset) refer to a group of images, which by itself, is insufficient to accurately and efficiently train an image-based machine-learning model, such as a generative machine-learning model. For instance, while the initial set of input images includes a small number of images (e.g., 5, 10, 20, or 25 images), in some instances, the initial set of input images includes more images (e.g., 100, 250, 500, 1000, 5000, or more images) However, as noted above, the number of images in the initial input image set is, in most case, not enough to accurately train an image-based machine-learning model. Additionally, the initial input image set commonly includes a common style, content, and/or theme throughout the set (e.g., all the images are chest X-rays).

Additionally, in various examples, the terms "expanded input image set" and "expanded set of images" refer to a type of input image set that includes stored images. For example, an expanded input image set includes both the initial input image set as well as various stored images.

Sharing another example, the term "stored images" refers to images previously captured, generated, modified, and/or received that are stored within an image catalog, image store, or image repository. Often, an image catalog (e.g., groups of categorized and/or classified images) includes different catalog entries of stored image sets grouped by style. In various examples, stored images are divided by different data styles (and/or content). For example, a style catalog includes image style sets of stored images grouped based on different image styles.

As another example of a term used in this document, the term "style-mixed image set" refers to a set of images that includes stored images from different catalog entries and/or having different data styles (e.g., from different image style sets). In many instances, style-mixed image sets are mixed in accordance with a style distribution (e.g., made up of multiple style distribution values), which is defined below.

As another example, the terms "synthesized images" or "generated images" refer to images generated by an image-based machine-learning model. For example, a generative machine-learning model generates, produces, or outputs images as part of performing a learned objective or task. In some implementations, synthesized images form some or all of a training image dataset.

For example, the term "machine-learning model" refers to a computer model or computer representation that can be tuned (e.g., trained) based on inputs to approximate unknown functions. For instance, a machine-learning model can include, but is not limited to, a transformer model, a sequence-to-sequence model, a neural network (e.g., a convolutional neural network or deep learning model), a decision tree (e.g., a gradient-boosted decision tree), a linear regression model, a logistic regression model, a random forest model, a clustering model, support vector learning, Bayesian network, regression-based model, principal component analysis, or a combination of the above. As used herein, the term "machine-learning model" includes deep learning models.

As another example, the term "neural network" refers to a machine learning model having interconnected artificial neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using training data to tune the parameters of the neural network. Examples of neural networks include a convolutional neural network (CNN), residual learning neural network, recurrent neural network (RNN), generative neural network, generative adversarial neural network (GAN), and single-shot detection (SSD) networks.

In this document, a machine-learning model often refers to an image-based machine-learning model, such as a generative machine-learning model or generative neural network. However, an image-based machine-learning model can also refer to other types of machine-learning models that process images (e.g., downstream machine-learning models associated with images). In various instances, a generative machine-learning model includes a generative neural network, such as a GAN or another type of generative machine-learning model. In many implementations, a generative machine-learning model has the functional goal of the generative model of generating synthesized images that are either indistinguishable from an original image set (e.g., an initial set of input images) or that have the same distribution as the original image set.

As an additional example of the terms used in this document, the terms "style distribution" or "style distribution set" refer to values, ratios, or percentages of different image styles corresponding to the image styles found in an initial set of input images. In various implementations, a style distribution includes one or more style distribution values, where a style distribution value corresponds to at least one stored image set. To illustrate, suppose the style matching system determines that three stored image sets (or catalog entries) have styles overlapping those found in an initial input image set. Accordingly, the style matching system generates a style distribution value for the catalog entries, such as determining the style distribution of 50%, 30%, and 20% for the three stored image sets (e.g., style sets) in the catalog, respectively. In various implementations, a larger style distribution value for the stored image set indicates a closer matching style to the initial input image set/target image set. In many implementations, the style distribution add up or sum to (or near) one (e.g., 100%). The style matching system can then sample stored images from the three stored image sets according to the style distribution, as further provided below.

Additionally, as an example, the term "conditional sampling" refers to filtering, targeting, guiding, or restricting a set of synthesized images to ones based on a target condition. For instance, conditional sampling includes identifying and selecting a particular subset of images and/or image embedding from a larger set in accordance with characteristics of those found in a target input image set. In various instances, the style matching system samples images that most closely align to a target input image set from a larger set of synthesized images created by the generative machine-learning model. In some instances, conditional sampling includes utilizing an input label as a seed that guides or suggests the model in a particular direction. In one or more implementations, a generative machine-learning model will train and learn conditional sampling within a large set of images, such as an extended dataset of input images.

Additional details will now be provided regarding the style matching system. To illustrate, FIG. 1 shows a schematic diagram of an environment 100 (e.g., a digital medium system environment) for implementing a style matching system 106. In particular, FIG. 1 introduces example components and elements that help better explain the functions, operations, and actions of the style matching system 106. Additionally, FIG. 1 includes various details regarding components and elements of the style matching system 106.

As illustrated in FIG. 1, the environment 100 includes a client device 102, a computing device 108, and a server device 110 that each communicates with each other via a network 130. Additional details regarding these and other computing devices are provided below in connection with FIG. 7. In addition, FIG. 7 also provides additional details regarding networks, such as the network 130 shown.

As mentioned, the style matching system 106 generates large datasets of images that accurately match the style and content of a small image set (e.g., an initial set of input images). In particular, the style matching system 106 performs a variety of actions and utilizes different components, such as a generative machine-learning model, to create a rich and diverse, yet targeted, larger dataset of images (e.g., style-matching images) that closely aligns with a small image set. Indeed, the style matching system 106 generates a set of style-matching images that appear to be the same as the initial set of sample input images, as if the set of sample input images and the synthesized style-matching images naturally belonged together.

As illustrated in FIG. 1, the style matching system 106 is shown on both the client device 102 and the server device 110. To indicate that the style matching system 106 can be located in one or more locations, it is shown with dashed lines. For instance, the style matching system 106 may be located, wholly or in part, on one or more computing devices. For example, a portion or instance of the style matching system 106 on the client device 102 receives the initial set of input images and provides them to another portion or instance of the style matching system 106 of the server device 110 to generate the expanded set of input images. As another example, a generative neural network is trained and tuned on the server device 110 and provided to the client device 102 for inferencing. For ease of explanation, details and components of the style matching system 106 are described as part of the server device 110.

As mentioned above, the environment 100 includes the client device 102. As shown, the client device 102 includes an image management system 104, which incorporates the style matching system 106. The client device 102 can include additional components not shown. The image management system 104 performs a variety of functions. For example, in one or more implementations, the image management system 104 facilitates the management of various digital images. In one or more implementations, the image management system 104 facilitates, identifies, receives, accesses, opens, loads, edits, modifies, moves, copies, shares, saves, removes, deletes, stores, downloads, transmits, and/or imports images. While this document focuses on digital images, similar principles, approaches, actions, and methods apply to other types of digital content, such as digital documents (e.g., generating a larger corpus of digital documents from a small sample set).

As shown, the environment 100 includes the computing device 108. For example, the computing device corresponds to an entity that provides the initial input image set to the client device 102 to generate a large image dataset of style-matching images. In various implementations, the computing device 108 and the client device 102 are the same device. For example, the computing device 108 utilizes a client application (e.g., a browser, mobile application, desktop application, system program, and/or user interface) to access and provide the style matching system 106 with an initial set of input images. In response, the style matching system 106, located locally or remotely, generates a style-matching image set.

Turning now to the server device 110, as shown, the server device 110 includes an instance of the style matching system 106 that includes various components and elements. For example, the style matching system 106 includes an image manager 112, a probabilistic image style expansion manager 114, a generative model manager 116, a conditional style sampling manager 118, and a storage manager 120. As also shown, the storage manager 120 includes input images 122, synthesized images 124, and conditionally sampled images 126.

In various implementations, the components and elements of the style matching system 106 facilitate the actions described in this document with respect to the style matching system 106. For example, the image manager 112 manages the various types of images, such as input images 122, synthesized images 124, and conditionally sampled images 126 (e.g., style-matched images). In some implementations, the probabilistic image style expansion manager 114 expands the initial set of input images into an expanded input image set. In additional implementations, the probabilistic image style expansion manager 114 utilizes probabilistic techniques, as further described below.

In various implementations, the generative model manager 116 manages the generation, training, tuning, and inferencing of generative machine-learning models, such as a generative neural network to generate synthesized images 124. For example, the generative model manager 116 trains and utilizes a generative machine-learning model to generate synthesized images 124 based on an expanded set of input images 122. Likewise, in various implementations, the conditional style sampling manager 118 produces conditionally sampled images 126 utilizing a generative machine-learning model. Each of these actions is further described below in connection with the subsequent figures.

Additionally, the style matching system 106 includes the storage manager 120. In various implementations, the storage manager 120 includes data used by any of the components of the style matching system 106 in performing the features and functionalities described in this document. For example, the storage manager 120 may include the input images 122 (e.g., initial input images and expanded input images), the synthesized images 124, the conditionally sampled images 126 and/or additional data. For example, the storage manager 120 also includes one or more generative machine-learning models and/or image-based machine-learning models.

Although FIG. 1 illustrates a particular number, type, and arrangement of components within the environment 100, various additional environment configurations and arrangements are possible. For example, the environment 100 includes additional client devices and/or computing devices. In some implementations, the environment 100 operates on a single computing device or computer cluster.

Figure 2:
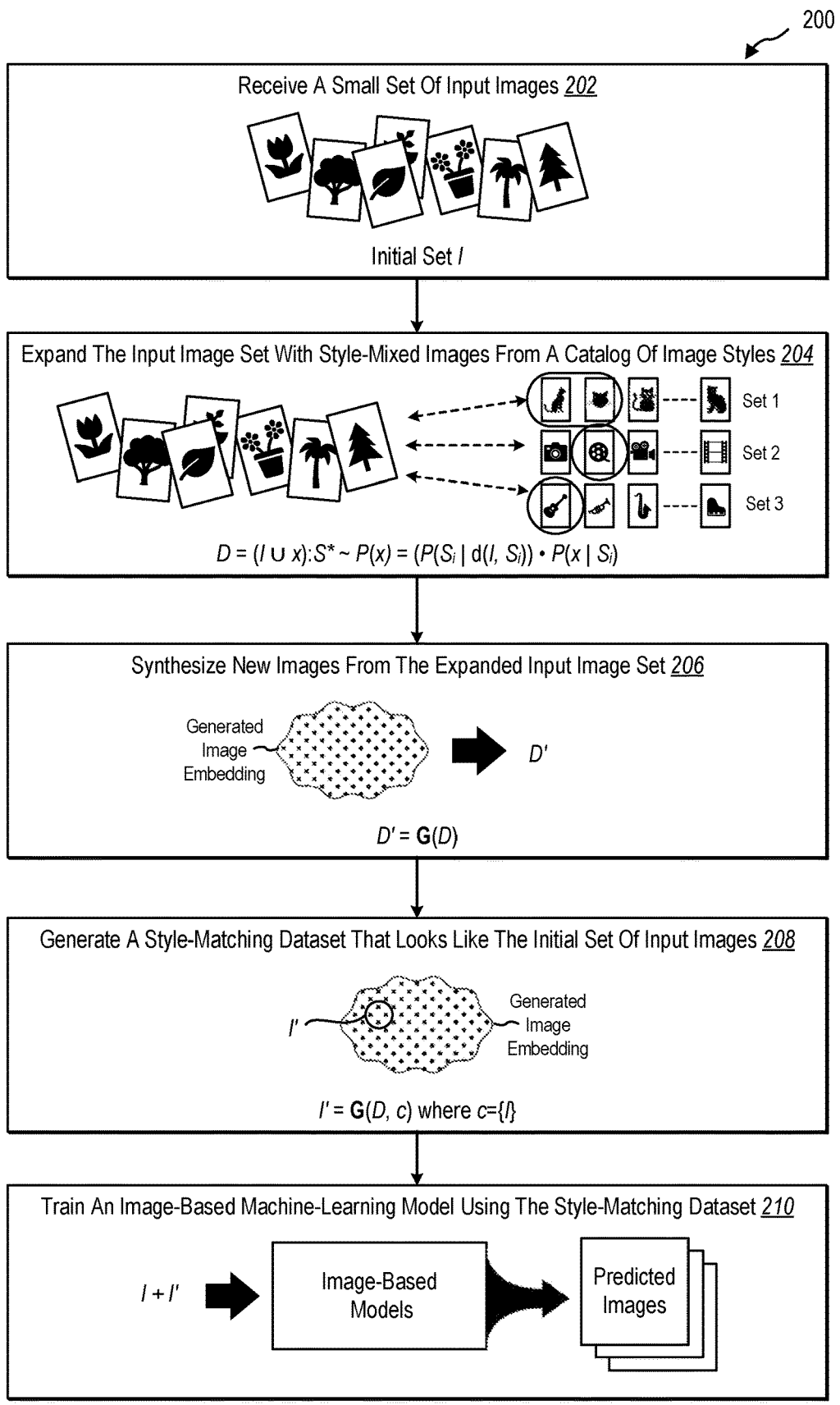
FIG. 2 illustrates an example overview for generating a large dataset of style-specific and content-specific images that match a small sample image set in accordance with one or more implementations.

Additional details in connection with an example implementation of the style matching system 106 are discussed in connection with FIG. 2. For example, FIG. 2 illustrates an example overview for implementing a style matching system to generate a large dataset of style-specific and content-specific images that match a small sample image set in accordance with one or more implementations. As shown, FIG. 2 illustrates a series of acts 200, where one or more of the acts can be performed by the style matching system 106.

As shown in FIG. 2, the series of acts 200 includes an act 202 of receiving a small set of input images (i.e., I). For example, the style matching system 106 on a client device receives, loads, identifies, or otherwise accesses a handful of input images. By themselves, the number of images is not sufficient to accurately or efficiently train an image-based machine-learning model. Yet, if other images were used, the image-based machine-learning model would not produce accurate results. Accordingly, the style matching system 106 receives the small set of images with a request to generate a large dataset of style-matching images having styles and content that match the initial or original small sample set of input images.

As a practical example, the small set of input images corresponds to patient chest X-rays. For various reasons, such as privacy or restricted availability, only a limited number of input images are provided. However, the provider of the input images desires to perform functions, operations, analyses, or predictions on the image set via an image-based machine-learning model. Accordingly, the style matching system 106 provides this desired benefit and practical advantage through technological actions and advancements.

As shown in FIG. 2, the series of acts 200 includes an act 204 of expanding the input image set with style-mixed images from a catalog of image styles. For example, the style matching system 106 compares the small set of input images to different stored image sets within the stored image catalog (e.g., image style sets within an image style catalog). For instance, the style matching system 106 determines how similar each image style set is to the small set of input images. Then, based on the style similarity values, the style matching system 106 generates a style distribution and selects a proportional number of sample images from each image style set to generate an extended input image set. In many implementations, the expanded input image set (i.e., D) includes the small set of input images (i.e., I) plus the style mixed sampled images (i.e., S*).

Returning to the example of chest X-rays, the style matching system 106 determines some correspondence to different image style sets that include other X-rays images. In some instances, the style matching system 106 determines similar values with drawings of chest X-rays. In still other instances, the style matching system 106 determines a similar value with black and white pictures. In various implementations, the style matching system 106 normalizes the style similarity values across the image style sets and samples images from the image style sets according to the style distribution. An expanded description of the act 204 of expanding the input image set with style-mixed images is provided below in connection with FIG. 3.

As shown in FIG. 2, the series of acts 200 includes an act 206 of synthesizing new images from the expanded input image set. In various implementations, the style matching system 106 utilizes a generative machine-learning model and/or a deep learning model to generate new synthesized images that appear similar in style and content to input images. For example, the style matching system 106 utilizes a generative neural network (e.g., G(·)) that generates a large image dataset (e.g., D') from the expanded set of input images (e.g., D).

In the provided example, the style matching system 106 utilizes a generative machine-learning model or a generative neural network to generate several synthesized images that match images from the expanded input image sets. Because the expanded input image set includes images that may differ in style or content from the small set of input images, the resulting synthesized images will create an embedding space different from that of the small set of input images. However, the embedding space generated from the expanded input image set will encompass the embedding space corresponding to the small set of input images as well as show natural expansions and missing subspaces that correspond to the embedding of the small set of input images. An expanded description of the act 206 of synthesizing new images from an expanded input image set is provided below in connection with FIG. 4.

As shown in FIG. 2, the series of acts 200 includes an act 208 of generating a style-matching dataset (e.g., I') that looks like the initial small set of input images. For instance, the style matching system 106 utilizes conditional sampling in connection with the generative machine-learning model to sample images that match the style and the content of the original small set of input images. For example, the style matching system 106 samples synthesized images from the embedding space defined by the generator model, created from the expanded input image set (e.g., D) and conditioned (e.g., c) upon the small set of input images (e.g., I) to identify those synthesized images that most closely match the initial small set of images in both style and content.

To illustrate, while the generated image embedding space creates numerous types of images that appear as chest X-rays, other types of X-rays, and/or other chest images, many of these synthesized images are dissimilar to the look and feel of the initial smallest set of images. Accordingly, the style matching system 106 identifies the synthesized images within the generated image embedding space that closely align in both style and content to the small set of input images.

To further elaborate, the style matching system 106 samples images in the generating image embedding space that are most like those of the small set of input images. As a significant technical benefit, these conditionally sampled images will be more diverse and richer than the original small set of input images due to the influences of the other images in the generated input embedding space while at the same time preserving the integrity of the small set of input images, and thus, allowing the style-matching dataset to be a true and accurate representation of the small set of input images. An expanded description of the act 208 of conditionally sampling style-matching images is described below in connection with FIG. 5.

As shown, the series of acts 200 includes an act 210 of training an image-based machine-learning model using the style-matching dataset. In various implementations, the style matching system 106 or another image model system utilizes the style-matching dataset to train and/or apply an image-based machine-learning model or image-based neural network. Because the style-matching dataset is sufficiently large and accurately represents the small sample set of input images, the image-based machine-learning model will be able to efficiently produce accurate results and/or perform other downstream operations that it otherwise is unable to perform.

As mentioned above, FIG. 3 provides additional detail regarding operations of the style matching system 106 with respect to expanding an input image set with style-mixed images. In particular, FIG. 3 illustrates an example flow diagram for expanding an input image set with style-mixed images from stored image sets in accordance with one or more implementations. As shown, FIG. 3 includes several sub-acts for the act 204 of expanding the input image set with style-mixed images from a catalog of image styles, which is briefly described above in connection with FIG. 2.

As shown, the act 204 in FIG. 3 includes a sub-act 302 of identifying a catalog of stored image sets (e.g., $S_1$, $S_2$, . . . , $S_i$, where i is the number of image sets). In various implementations, the style matching system 106 identifies and/or accesses a catalog of stored images. For instance, the catalog is a style catalog that includes multiple image style sets of stored images, where each image style set includes a group of images according to different image styles. In alternative implementations, the catalog includes catalog entries grouped based on different metrics. For example, the catalog entries are organized by content (e.g., cats) or another image attribute. In certain implementations, stored images are not separated within the catalog but rather are determined to belong to a group or stored image set based on being assigned to an image cluster of like stored images.

As also shown, the act 204 includes a sub-act 304 of generating embeddings of the initial input images. For example, under various implementations, the style matching system 106 generates one or more image embeddings of the initial set of input images (e.g., generating a first set of image embeddings based on the initial set of input images). In many implementations, the style matching system 106 utilizes an image-based machine-learning model, an image-based neural network, or another deep-learning model to generate image embeddings. In this manner, two images or image sets are directly comparable.

Additionally, the act 204 includes a sub-act 306 of generating (or identifying) image embeddings of each stored image set in the catalog of stored images. For example, the style matching system 106 determines and/or generates image embeddings for each of the stored image sets or catalog entries in the catalog of stored images. For example, the style matching system 106 generates a second set of image embeddings based on a first stored image set of the multiple sets of stored images and a third set of image embeddings based on a second stored image set of the multiple sets of stored images. In some cases, a stored image set has been previously associated with one or more image embeddings. In some instances, a stored image set has one or more embeddings stored as metadata and associated with the set. Here, the style matching system 106 need not re-generate any embeddings for the set unless the stored image set has been modified.

Regarding embeddings, the style matching system 106 can utilize various types of embeddings for an image set. For example, in one or more implementations, the style matching system 106 (or another system or model) generates an image embedding for every image in a set. This may be reasonable for smaller image sets, such as the initial set of input images, but less feasible for larger image sets. In some implementations, an image set includes representative embeddings. For instance, an image set is represented by a combined embedding based on multiple images in the image set.

To illustrate, in one example, an image set is represented by embeddings from one or more randomly selected images in the image set. In another example, an image set is represented by a central embedding determined by the center or the densest part of the embedding space for the image set. In a different example, an image set is represented based on embeddings determined from clusters within the embedding space of an image set. For instance, a larger image set is divided into 100 clusters (or another number, K, of clusters) and the image set is represented using one embedding from each cluster. In this instance, storing representative embeddings for an image space reduces the amount of storage needed to store settings for the image set. Indeed, the style matching system 106 can determine image embeddings for an image set in a number of different ways.

As shown, the act 204 includes a sub-act 308 of determining, for each stored image set in the catalog, an embedding distance with the initial set of input images. This is shown in FIG. 3 by the example of ($S_i$|d(I, $S_i$)), where $S_i$ is a stored image set (e.g., image style set), I is the initial set of input images, and d(·) is a distance function. In this manner, the style matching system 106 identifies stored image sets (or catalog entries) that share one or more similar style characteristics to the sample input image set.

In various implementations, the style matching system 106 determines how similar the initial set of input images is to one or more of the image sets in the catalog of stored images. For example, the style matching system 106 determines a style similarity value between the initial set of input images and each of the image style sets in the catalog. To elaborate, in various implementations, the style matching system 106 determines a style similarity value for an image style set based on comparing embedding distances between the image style set and the initial set of input images. In alternative implementations, rather than comparing image embeddings, the style matching system 106 directly compares one or more images from a stored image set to one or more images in the initial set of input images to determine the style similarity value.

Regarding image embedding comparisons, the style matching system 106 can compare embeddings between the initial set of input images and the stored image sets of the catalog in a variety of ways. For example, the style matching system 106 determines the shortest distance (e.g., Euclidean or another type of distance measurement) between any point in the input image set to any point within a stored image set (e.g., an image style set in a style catalog). As another example, the style matching system 106 determines the distance between representative embeddings (as described above) determined for each image set, such as from the center of one embedding space to the center of the other embedding space.

Continuing on, in some examples, the style matching system 106 takes an average distance between one or more points (e.g., vector distances) in the input image set and one or more points within the stored image set. In various implementations, the style matching system 106 determines similarity based on comparing vector angles, direction, and/or magnitude along with, or in place of, distance. Indeed, the style matching system 106 can utilize a variety of methods and approaches to determine a style similarity value between embeddings of two image sets.

As another example, in some implementations, the style matching system 106 determines a first embedding distance (e.g., style distance) between the first set of image embeddings mentioned above and the second set of image embeddings as well as a second embedding distance between the first set of image embeddings and the third set of image embeddings, as mentioned above.

In various implementations, the style matching system 106 utilizes a probabilistic determination to determine similarities for each of the stored image sets in the catalog. For example, the style matching system 106 follows the formula of P($S_i$|d(I, $S_i$)), where P refers to a probabilistic determination. In this case, a stored image set with a higher probability represents a lower distance between the stored image set of the initial set of input images. In various implementations, using a probabilistic determination narrows the stored image sets based on the distribution of how likely each stored image set is to have a matching style with the initial set of input images.

As shown, the act 204 includes a sub-act 310 of determining a style distribution for the stored image sets that reflect the style correlations with the initial set of input images. For example, the style matching system 106 generates a style distribution that indicates how stylistically similar each of the stored image sets of the catalog is to the initial set of input images compared to the other stored image sets in the catalog. For example, the style matching system 106 determines, based on comparing the first embedding distance to the second embedding distance from the above examples, a style distribution that includes a first style distribution value for the first stored image set and a second style distribution value for the second stored image set (e.g., a style distribution value in a value on the distribution over style sets that is proportional to the distance between a style set and the input set). To elaborate, distances are measured between two sets, first input embeddings and second, a representative set of embeddings for a single stored image set. This can then be repeated for each stored set. In this manner, this induces a distribution over the stored sets.

In various implementations, the style matching system 106 generates a style distribution by normalizing and/or generating a proportional ratio or distribution percentage among the stored image sets based on their corresponding style similarity values. In this manner, a stored image set with a larger style similarity value will have a larger style distribution value, distribution percentage, or proportional ratio than another stored image set with a lower style similarity value. In some implementations, the style matching system 106 does not include stored image sets with an image similarity value below a threshold score in the style distribution.

To provide an illustration, suppose a style catalog of stored images includes five image style sets identified as Image Set A-D. Also, suppose that the style matching system 106 determines a style similarity value (e.g., between 0-10) for the image sets as follows: 5 for Image Set A, 3 for Image Set B, 2 for Image Set C, and 0.5 for Image Set D. In this example, after dropping the Image Set D for being below a similarity value threshold of 1.0 and normalizing the remaining image sets (e.g., dividing each value by the sum of all the values), the style matching system 106 determines style distribution values that indicate Image Set A as 50%, Image Set B as 30%, and Image Set C as 20%.

As shown, the act 204 includes a sub-act 312 of sampling stored images from one or more stored image sets in accordance with the style distribution over the stored image sets. This is shown in FIG. 3 by the formula $(x|S_i)$, where x is one or more sampled images being sampled from a stored image set (e.g., $S_i$).

In various implementations, the style matching system 106 utilizes the style distribution to determine how many stored images to sample from each stored image set. For example, for a stored image set, the style matching system 106 samples the number of stored images indicated in a corresponding style distribution value. As another example, the style matching system 106 samples stored images from a stored image set according to the proportion ratio or distribution percentage determined for the set. To illustrate, following the above example, the style matching system 106 samples 5 images from Image Set A, 3 images from Image Set B, 2 Images from Image Set C, and 0 images from Image Set D.

In various implementations, the style matching system 106 samples images from stored image sets probabilistically. For example, the style matching system 106 utilizes the following formula $P(x|S_i)$ to select sample images from a given stored image set. In this manner, images are selected in expectation of the style distribution and conditioned on the stored image set, meaning that more or fewer images may be sampled from a given stored image set. To illustrate, in the above example, in one case, using probabilistic sampling, the style matching system 106 may select 9 sample images from Image Set A and 1 sample image from Image Set B. In another case, the style matching system 106 may select three images from each image set. In some instances, using probabilistic sampling increases the robustness of image sampling from an image catalog.

As shown, the sub-act 312 includes another sub-act 314 of sampling images from the stored image sets based on image content. In one or more implementations, the style matching system 106 selects images from an image set randomly, uniformly, or according to another metric (e.g., based on a distribution). While this provides a higher chance that an image will be selected from one of the denser areas of the stored image set, every image in the stored image set has an equal chance of being sampled. Accordingly, in some implementations, the style matching system 106 further considers image content when sampling images from a stored image set.

To further illustrate, the sub-act 314 shows the example formula of $$\operatorname*{argmin}_{x \in S_i}(d(I, x)),$$

where each variable is as defined above. In implementations that follow this formula, the style matching system 106 first determines which images in a given storage image set are closest to one or more images in the initial set of input images. In this formula, I represent an individual image embedding, an image itself, or a representative embedding of one or more images in the initial input image set. In this manner, in addition to first sampling stored images based on image style, the style matching system 106 further narrows the selection of sampled images based on image content and or individual embeddings (e.g., a closest instance). In other words, in these implementations, the style matching system 106 minimizes the image distance between sampled stored images and the initial set of input images.

Accordingly, in one or more implementations, the style matching system 106 performs the sub-acts 304-312 using the example formula of $S^*=(S_i|d(I, S_i))\cdot(x|S_i)$, where $S^*$ is the sample images (e.g., the set of points x) sampled from the catalog of stored images. As provided above, the style matching system 106 determines $S^*$ by selecting a sample for each catalog entry or stored image set based on the perceptual/stylistic distance between I and $S_i$. In various implementations, when utilizing probabilistic techniques, the style matching system 106 follows the example formula of $D=(I \cup x):S^*\sim P(x)=P(S_i|d(I, S_i))\cdot P(x|S_i)$ to perform the sub-acts 304-312.

As shown, the act 204 includes a sub-act 316 of generating an expanded set of input images by combining the initial set of input images and the images sampled from the catalog. As shown, the sub-act 316 includes the example formula of $D=\{I+S^*\}$ where D refers to an expanded input image set. Stated differently, the example formula is expressed as $D=\{I \cup S^*\}$ or $D=(I \cup x):S^*$ to represent the expanded input image set, which includes both the initial set of input images and the sample stored images from the catalog (e.g., style catalog). In this manner, the style matching system 106 expands the input image set with style-mixed images from a catalog of image styles that corresponds to the initial set of input images. In a few implementations, the expanded set of images includes only the sampled images and not the initial set of input images.

Figure 4:
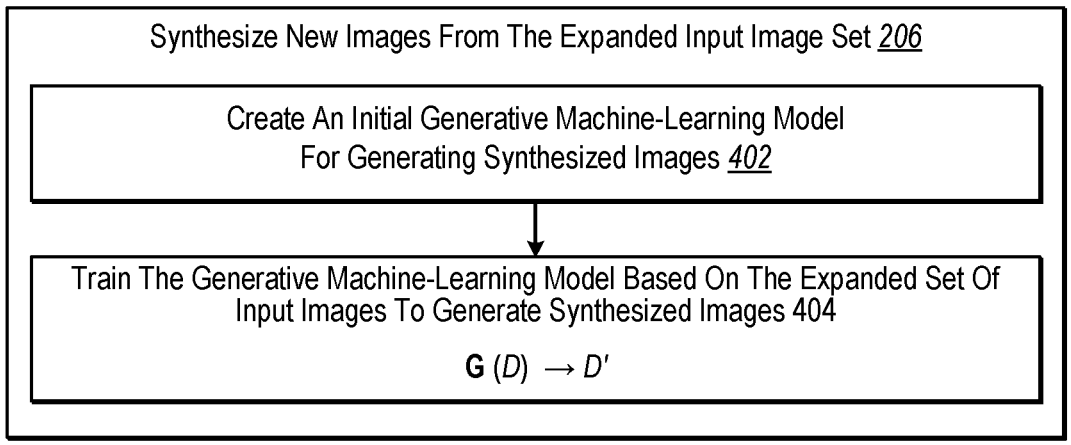
FIG. 4 illustrates an example flow diagram for generating a generative machine-learning model to synthesize new style-matching images from the expanded input image set in accordance with one or more implementations.

As mentioned above, FIG. 4 provides additional detail regarding operations of the style matching system 106 with respect to synthesizing new images from an expanded input image set. In particular, FIG. 4 illustrates an example flow diagram for generating a generative machine-learning model to synthesize new style-matching images from the expanded input image set in accordance with one or more implementations. As shown, FIG. 4 includes sub-acts for the act 206 of synthesizing new images from the expanded input image set, which is briefly described above in connection with FIG. 2.

As shown, the act 206 in FIG. 4 includes a sub-act 402 of creating an initial generative machine-learning model for generating synthesized images. For example, in various implementations, the client device 102 generates a machine-learning model (e.g., a generative neural network) that outputs synthesized images based on input images. In one or more implementations, rather than generating a model, the client device 102 obtains a previously constructed generative machine-learning model. For instance, the client device 102 obtains a pre-trained or initially-trained generative machine-learning model.

In various implementations, the functional goal of the generative machine-learning model (or generative model for short) is to synthesize images that are either indistinguishable in style and/or content from the input images or have the same distribution as the input images. By utilizing a generative model, the style matching system 106 generates a larger image set of analogous images that appear to belong to a given input image set. With more images in a dataset, the style matching system 106 is able to more accurately and efficiently train itself as well as train downstream image-based machine-learning models. In some cases, the generative model generates thousands of synthesized images.

As also shown, the act 206 includes a sub-act 404 of training the generative machine learning model based on the expanded set of input images to synthesize new images. In various implementations, the client device 102 trains the generative model with the expanded set of input images to learn features and/or a feature space that corresponds to the expanded set of input images. In this manner, the generative model learns accurate data distribution probabilities for features of the expanded set of input images (e.g., D).

In various implementations, the client device 102 trains and/or utilizes the expanded set of input images as an input to generate a variety of synthesized images that are similar in image style and/or image content (but not identical) as the expanded set of input images. However, the style matching system 106 improves image diversity by utilizing the entire expanded set of input images to train the generative model. Indeed, the style matching system 106 trains the generative model to learn a capable and robust distribution space over the entire expanded set of input images, which is broader and more feature-rich than a distribution space for the initial set of input images alone.

As shown, in one or more implementations, the sub-act 404 includes the style matching system 106 following the example formula of $G(D) \rightarrow D'$, where $G(\cdot)$ represents a generative machine-learning model and $D'$ represents a large, synthesized image set distributed across the expanded set of input images (e.g., D). In various implementations, the generative model is a generative adversarial neural network (GAN), which generates synthesized images at a high level of accuracy such that it fools a well-trained adversarial model trained to detect synthesized output images from real input images. In alternative implementations, the generative model includes one or more other types of deep-learning generator models (e.g., diffusion models) that make synthesized images.

Additionally, in various implementations, the style matching system 106 trains the generative model to minimize the loss of a first objective function that corresponds to generating synthesized images that appear like given input images. The style matching system 106 can train the generative model for a number of iterations until the first objective function is satisfied, until a time limit is reached, and/or until model convergence.

Figure 5:
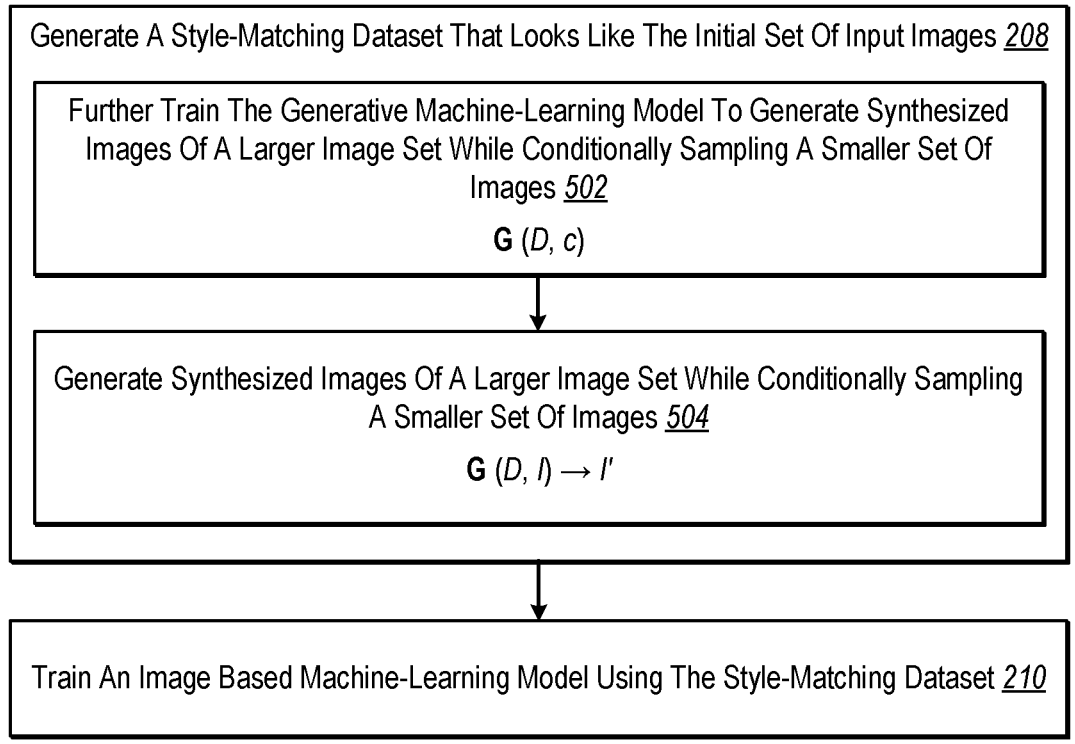
FIG. 5 illustrates an example flow diagram for utilizing the generative machine-learning model to generate a style- and content-matching dataset by conditionally sampling generated images that match an initial input image set in accordance with one or more implementations.

As mentioned above, FIG. 5 provides additional details regarding operations of the style matching system 106 with respect to conditionally sampling style-matching images. In particular, FIG. 5 illustrates an example flow diagram for utilizing the generative machine-learning model to generate a style- and content-matching dataset by conditionally sampling generated images that match an initial input image set in accordance with one or more implementations. As shown, FIG. 5 includes sub-acts for the act 208 of generating a style-matching dataset that looks like (e.g., are analogous to) the initial small set of input images, which is briefly described above in connection with FIG. 2.

As shown, the act 208 in FIG. 5 includes a sub-act 502 of further training the generative machine-learning model to generate synthesized images of a larger image set while conditionally sampling a smaller set of images. For example, in various implementations, the style matching system 106 further trains the generative model to conditionally sample a target set of images from a broader (e.g., in terms of style and content) range of input images. In this manner, the style matching system 106 tunes the generative model by guiding the generative machine-learning model to sample synthesized images that corresponds to a target set of images. Indeed, images in the sampled set have been influenced by the generated features and characteristics of similarly styled images based on images found outside of the initial set of input images (e.g., from sampled stored images included in the expanded set of input images).

In one or more implementations, the style matching system 106 utilizes the example formula shown in the sub-act 502 of $G(D, c)$, where c represents a condition or target set of input images upon which the generative model is conditioned. For instance, the style matching system 106 trains the generative model to minimize (or maximize) a second objective function with respect to conditionally sampling a target image set. In some implementations, the style matching system 106 trains a generative model to jointly learn the first and second objective functions together. By providing a condition to the generative model trained to generate synthesized images based on image style, the style matching system 106 adds the additional layer of producing synthesized images that also share analogous image content.

Upon further training the generative model, the style matching system 106 utilizes conditional sampling within the generative model to isolate synthesized images (e.g., their embeddings) that most closely align to the style and content of images in a smaller target set within the larger feature space, which is generated based on the full set of input images. In some implementations, the style matching system 106 utilizes different images for the condition or target image set. For example, the target image set includes images not previously used in training.

As shown, the act 206 includes a sub-act 504 of generating a large dataset of images having the style and content of the initial set of input images by utilizing the trained generative machine-learning model and conditional sampling. In various implementations, the style matching system 106 provides the expanded set of input images as a first input (e.g., D) and the initial set of input images (e.g., I) as the conditional set of images. In response, the generative model generates a set of synthesized style-matching images (e.g., I') that match the style and content of the initial set of images, but that also is influenced by the full distribution of the style features of the expanded set of input images. The resulting style-matching images result in a richer and more diverse image set that also appears to fully belong to the initial set of input images (e.g., the style-matching images share a similar distribution to the initial set of input images). This is shown by the example formula of G(D, c)→I'.

In some implementations, the style matching system 106 provides the large, synthesized image set distributed across the expanded set of input images (e.g., D') as the first input to the generative model along with the second conditional input (e.g., c). In these implementations, the style matching system 106 trains the generative model or a second, different generative model to generate the style-matching images of G(D, c)→D'|c' from D' rather than from D.

As noted above, in various implementations, the style matching system 106 provides the first larger input and the second smaller conditional input to the generative model, which generates the style-matching images that are analogous to the conditional input. In one or more implementations, the generative model reduces the sampling space from the distribution of larger image features, which is aligned with the conditional input images. Accordingly, the style matching system 106 both expands and focuses on the distribution of potential image features of the initial set of input images that contribute to the resulting style-matching images.

In one or more implementations, the style matching system 106 utilizes the trained generative model, as described above, to generate a large, feature-diverse, rich, and targeted dataset of images that accurately aligns with a small set of sample input images. In this manner, the style matching system 106 converts a handful of images into a large dataset of images that are indistinguishable in distribution from the original images.

As shown, FIG. 5 also includes the act 210 of training an image-based machine learning model using the style-matching dataset. In various implementations, the style matching system 106 utilizes the style-matching image set and/or their corresponding customized pre-trained embeddings to improve the functions and operations of other image-based machine-learning models. Indeed, unlike existing computer systems that produce overfitted and/or inaccurate datasets from small image sample sets, the style matching system 106 generates well-tailored image datasets for leveraging the learned representations on downstream image-based machine-learning models, which has not been previously possible with this level of accuracy or efficiency from a small input image set.

Figure 6:
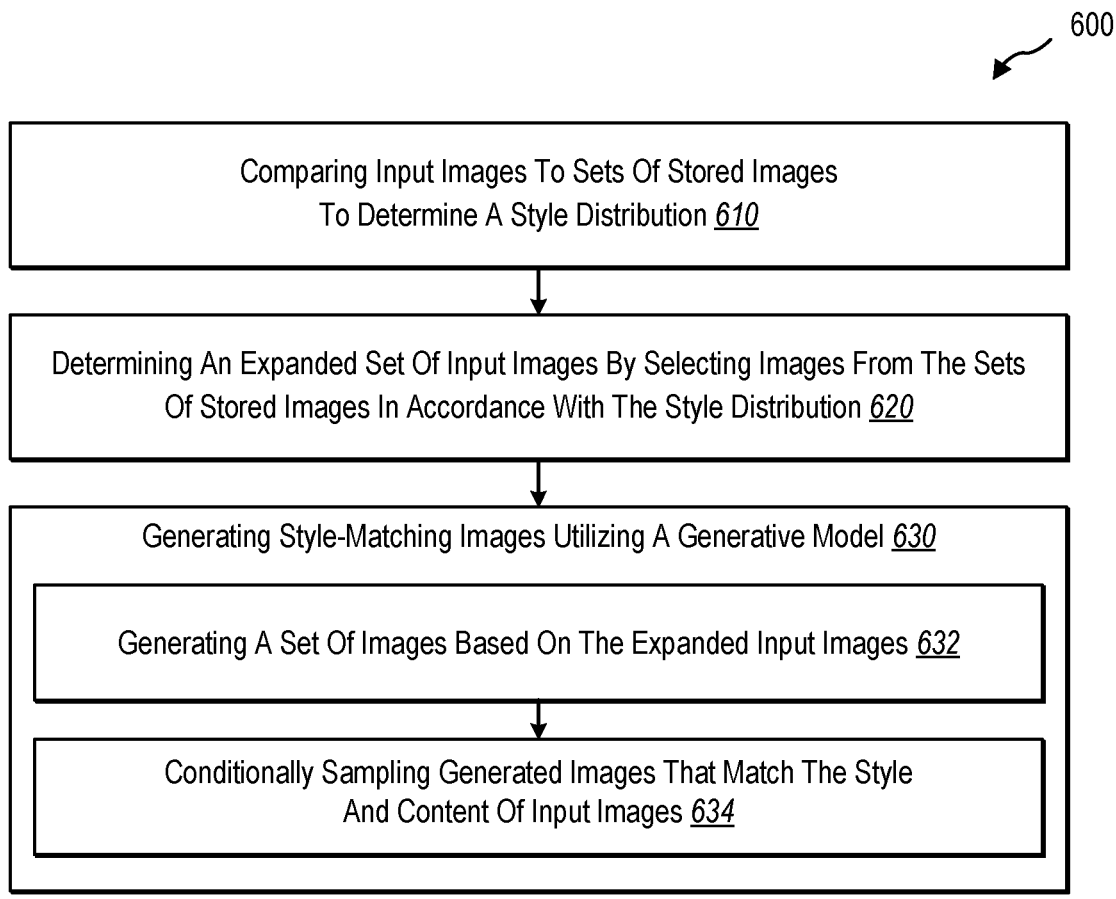
FIG. 6 illustrates an example series of acts for generating a large dataset of style-specific and content-specific images from a small sample image set in accordance with one or more implementations.

Turning now to FIG. 6, this figure illustrates an example flowchart that includes a series of acts for utilizing the style matching system 106 in accordance with one or more implementations. While FIG. 6 illustrates acts according to one or more implementations, alternative implementations may omit, add to, reorder, and/or modify any of the acts shown. Further, the acts of FIG. 6 can each be performed as part of a method. Alternatively, a non-transitory computer-readable medium can include instructions that, when executed by at least one processor, cause a computing device to perform the acts of FIG. 6. In still further implementations, a system can perform the acts of FIG. 6.

To illustrate, FIG. 6 shows an example series of acts for generating a large dataset of style-specific and content-specific images from a small sample image set in accordance with one or more implementations. As shown, the series of acts 600 includes an act 610 of comparing input images to sets of stored images to determine a style distribution. For instance, the act 610 may involve comparing an initial set of input images to multiple sets (e.g., large sets) of stored image datasets to determine the style distribution between the initial set of input images and the multiple large sets of stored images.

In one or more implementations, the act 610 of comparing the initial set of input images to the multiple large sets of stored images includes generating a first set of image embeddings based on the initial set of input images, generating a second set of image embeddings based on a first stored image set of the multiple large sets of stored images, and generating a third set of image embeddings based on a second stored image set of the multiple large sets of stored images. In some implementations, the act 610 also includes determining a first embedding distance between the first set of image embeddings and the second set of image embeddings; determining a second embedding distance between the first set of image embeddings and the third set of image embeddings; and determining, based on comparing the first embedding distance to the second embedding distance, a first style distribution value for the first stored image set and a second style distribution value for the second stored image set, which are part of the determined style distribution. For example, the first style distribution value is proportional to the distance between the style set and the input set.

In many implementations, the first style distribution value for the first stored image set is larger than the second style distribution value for the second stored image set based on the first stored image set having a closer image style to a target image style of the initial set of input images. In certain implementations, the first style distribution value and the second style distribution value sum or add up to one (or approximate to one), when normalized.

As further shown, the series of acts 600 includes an act 620 of determining an expanded set of input images by selecting images from the sets of stored images in accordance with the style distribution. For example, the act 620 may involve determining an expanded set of input images by selecting images from one or more stored image sets of the multiple large sets of stored images in accordance with the style distribution across one or more style sets. In one or more implementations, the expanded set of input images includes the initial set of input images and the images selected from the one or more stored image sets.

In some implementations, the act 620 includes sampling stored images from the one or more stored image sets across a probabilistic distribution in accordance with a style distribution value determined for each of the one or more stored image sets. In various implementations, the act 620 includes sampling stored images in a given stored image set based on minimizing an image distance between images in the given stored image set and the initial set of input images.

As further shown, the series of acts 600 includes an act 630 of generating style-matching images utilizing a generative model. For example, the act 630 may include generating a set of style-matching images utilizing a generative machine-learning model. In one or more implementations, the act 630 includes generating a set of synthesized or generated images utilizing a first generative machine-learning model based on the expanded set of input images, and generating a set of style-matching images by conditionally sampling the set of style-matching images from the set of synthesized or generated images utilizing a second generative machine-learning model. In various implementations, the first generative machine-learning model is different from the second generative machine-learning model. In alternative implementations, the first generative machine-learning model and the second generative machine-learning model are the same generative machine-learning model.

In some implementations, the act 630 includes generating the set of style-matching images by utilizing the second generative machine-learning model to generate the set of style-matching images based on sampling generated images within an embedding space having image embeddings generated by the second generative machine-learning model that have the shortest embedding distance from embeddings of the initial set of input images.

As further shown, the act 630 includes a sub-act 632 of generating a set of images based on the expanded input images. For example, the sub-act 632 may involve generating a set of synthesized or generated images based on the expanded set of input images. In one or more implementations, the sub-act 632 includes training the generative machine-learning model based on the expanded set of input images to generate a trained generative machine-learning model.

As further shown, the act 630 includes a sub-act 634 of conditionally sampling generated images that match the style and content of input images. For example, the sub-act 634 may involve conditionally sampling the set of style-matching images from the set of synthesized or generated images based on the initial set of input images. In many implementations, the set of style-matching images closely aligns, matches, corresponds, is indistinguishable in style, and/or has the same distribution as the image style and the image content to the initial set of input images in style and content.

In one or more implementations, the sub-act 634 includes utilizing the generative machine-learning model to generate the set of style-matching images based on sampling images that correspond to the initial set of input images from an embedding space corresponding to the expanded set of input images. In various implementations, the sub-act 634 also includes conditionally sampling the set of style-matching images from the set of synthesized or generated images by generating the set of style-matching images with the trained generative machine-learning model utilizing the initial set of input images as a conditional input.

The series of acts 600 can include additional acts in various implementations. For example, in some implementations, the series of acts 600 includes an act of utilizing the set of style-matching images to train an image-based machine-learning model. Additionally, in one or more implementations, the series of acts 600 includes an act of receiving the initial set of input images from a client device and/or providing the set of style-matching images to the client device in response to receiving the initial set of input images.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the style matching system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by at least one processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 7:
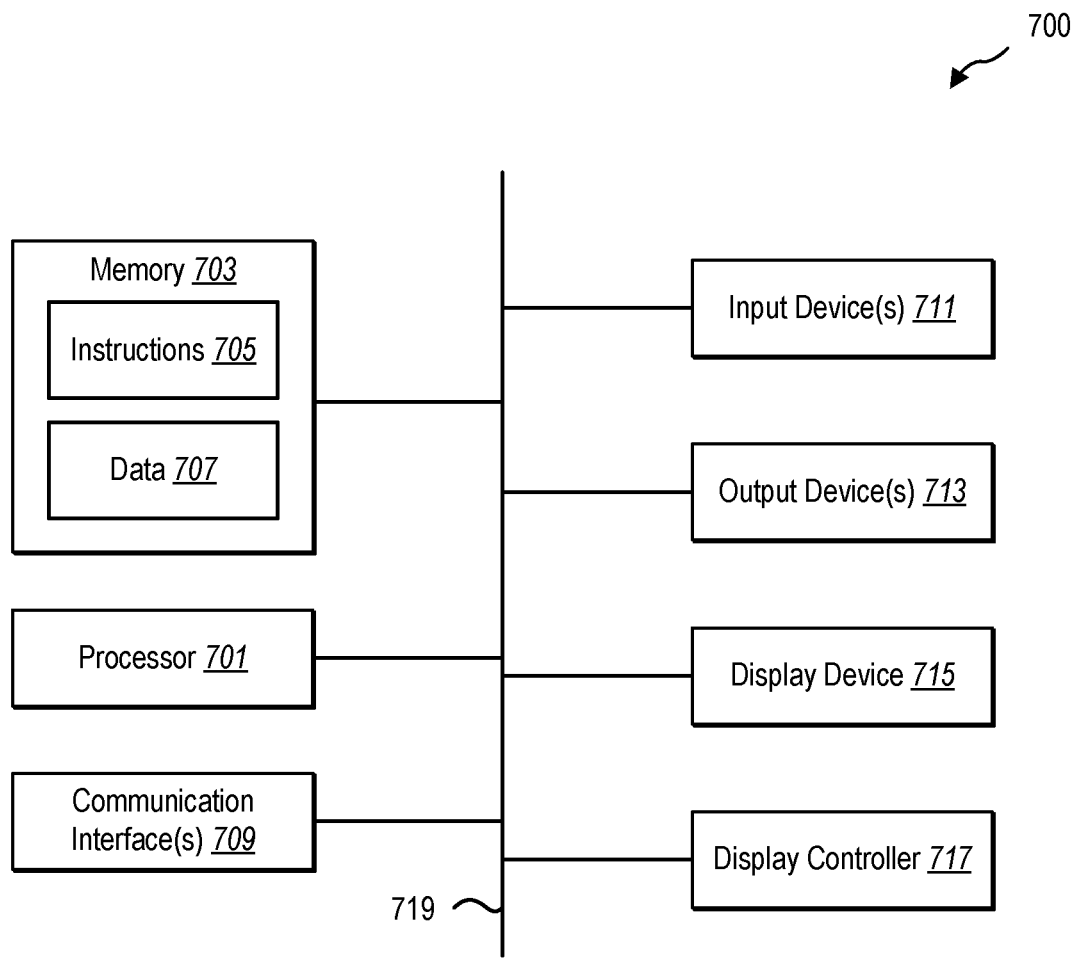
FIG. 7 illustrates certain components that may be included within a computer system.

FIG. 7 illustrates certain components that may be included within a computer system 700. The computer system 700 may be used to implement the various computing devices, components, and systems described herein.

In various implementations, the computer system 700 may represent one or more of the client devices, server devices, or other computing devices described above. For example, the computer system 700 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processor 701 (i.e., at least one processor). The processor 701 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method, comprising:
   comparing an initial set of input images to multiple large sets of stored image datasets to determine a style distribution between the initial set of input images and the multiple large sets of stored image datasets;
   determining an expanded set of input images by selecting images from one or more stored image sets of the multiple large sets of stored image datasets in accordance with the style distribution; and
   generating a set of style-matching images utilizing a generative machine-learning model by:
      generating a set of synthesized images based on the expanded set of input images; and
      conditionally sampling the set of style-matching images from the set of synthesized images based on the initial set of input images.

2. The computer-implemented method of claim 1, wherein the expanded set of input images comprises the initial set of input images and the images selected from the one or more stored image sets.

3. The computer-implemented method of claim 1, wherein comparing the initial set of input images to the multiple large sets of stored image datasets comprises:
   generating a first set of image embeddings based on the initial set of input images;
   generating a second set of image embeddings based on a first stored image set of the multiple large sets of stored image datasets; and
   generating a third set of image embeddings based on a second stored image set of the multiple large sets of stored image datasets.

4. The computer-implemented method of claim 3, wherein comparing the initial set of input images to the multiple large sets of stored image datasets further comprises:
   determining a first embedding distance between the first set of image embeddings and the second set of image embeddings;
   determining a second embedding distance between the first set of image embeddings and the third set of image embeddings; and
   determining, based on comparing the first embedding distance to the second embedding distance, the style distribution comprising a first style distribution value for the first stored image set and a second style distribution value for the second stored image set.

5. The computer-implemented method of claim 1, wherein determining the expanded set of input images by selecting images from the one or more stored image sets in accordance with the style distribution comprises sampling stored image datasets from the one or more stored image sets across a probabilistic distribution in accordance with a style distribution value determined for each of the one or more stored image sets.

6. The computer-implemented method of claim 1, wherein determining the expanded set of input images by selecting images from the one or more stored image sets in accordance with the style distribution comprises sampling stored image datasets in a given stored image set based on minimizing an image distance between images in the given stored image set and the initial set of input images.

7. The computer-implemented method of claim 1, wherein conditionally sampling the set of style-matching images from the set of synthesized images comprises utilizing the generative machine-learning model to generate the set of style-matching images based on sampling images that correspond to the initial set of input images from an embedding space corresponding to the expanded set of input images.

8. The computer-implemented method of claim 1, wherein generating the set of synthesized images based on the expanded set of input images comprises training the generative machine-learning model based on the expanded set of input images to generate a trained generative machine-learning model.

9. The computer-implemented method of claim 8, wherein conditionally sampling the set of style-matching images from the set of synthesized images comprises generating the set of style-matching images with the trained generative machine-learning model utilizing the initial set of input images as a conditional input.

10. The computer-implemented method of claim 1, further comprising utilizing the set of style-matching images to train an image-based machine-learning model.

11. A system comprising:
    at least one processor; and
    a computer memory comprising instructions that, when executed by the at least one processor, cause the system to carry out operations comprising:
       comparing an initial set of input images to multiple sets of stored images to determine a style distribution between the initial set of input images and the multiple sets of stored images;
       determining an expanded set of input images by selecting images from one or more stored image sets of the multiple sets of stored images in accordance with the style distribution; and
       generating a set of style-matching images utilizing a generative machine-learning model by:
          generating a set of synthesized images based on the expanded set of input images; and
          conditionally sampling the set of style-matching images from the set of synthesized images based on the initial set of input images.

12. The system of claim 11, further comprising instructions that, when executed by the at least one processor, cause the system to carry out operations comprising:
- receiving the initial set of input images from a client device; and
- providing the set of style-matching images to the client device in response to receiving the initial set of input images.

13. The system of claim 11, further comprising instructions that, when executed by the at least one processor, cause the system to carry out operations comprising:
- determining a first embedding distance between a first set of image embeddings corresponding to the initial set of input images and a second set of image embeddings corresponding to a first stored image set of the multiple sets of stored images;
- determining a second embedding distance between the first set of image embeddings and a third set of image embeddings corresponding to a second stored image set of the multiple sets of stored images; and
- determining a first style distribution value for the first stored image set and a second style distribution value for the second stored image set based on comparing the first embedding distance to the second embedding distance.

14. The system of claim 13, wherein the first style distribution value for the first stored image set is larger than the second style distribution value for the second stored image set based on the first stored image set having a closer image style to a target image style of the initial set of input images.

15. The system of claim 14, wherein the first style distribution value and the second style distribution value add up to one.

16. A computer-implemented method comprising:
- comparing an initial set of input images to multiple sets of stored images to determine a set of style distribution values between the initial set of input images and the multiple sets of stored images;
- determining an expanded set of input images by sampling images from a plurality of the multiple sets of stored images in accordance with the set of style distribution values;
- generating a set of synthesized images utilizing a first generative machine-learning model based on the expanded set of input images; and
- generating a set of style-matching images by conditionally sampling the set of style-matching images from the set of synthesized images utilizing a second generative machine-learning model.

17. The computer-implemented method of claim 16, wherein the set of style-matching images closely aligns image style and an image content to the initial set of input images in style and content.

18. The computer-implemented method of claim 16, wherein the first generative machine-learning model differs from the second generative machine-learning model.

19. The computer-implemented method of claim 16, wherein the first generative machine-learning model and the second generative machine-learning model are a same generative machine-learning model.

20. The computer-implemented method of claim 16, wherein generating the set of style-matching images comprises utilizing the second generative machine-learning model to generate the set of style-matching images based on sampling generated images within an embedding space having image embeddings generated by the second generative machine-learning model that have a shortest embedding distance from embeddings of the initial set of input images.

* * * * *